Feb. 15, 1938. C. VAN H. KING, JR 2,108,600

CONTAINER

Filed June 16, 1936

Inventor

Clarence Van H. King Jr.

Patented Feb. 15, 1938

2,108,600

UNITED STATES PATENT OFFICE 2,108,600

CONTAINER

Clarence Van H. King, Jr., San Francisco, Calif.

Application June 16, 1936, Serial No. 85,522

1 Claim. (Cl. 62—91.5)

My invention is a container which will hold its contents within certain maximum and minimum degrees of temperature essential for the preservation of the container's contents; it has for its object the effecting of a cheaper method of storing and transporting substances, particularly food, which require, for their preservation in commercial form, to be kept within certain temperature limits.

I attain this object by the container constructed as described herein and as illustrated in the accompanying drawing and the circulation of cold $CO_2$ gas which is sublimated directly from solid $CO_2$. I make no claims to the generation or circulation of the gas; my invention is confined to a novel construction of a container which will induce and allow such circulation.

The container is, except for one element referred to below, constructed of a material of relatively low heat conducting capacity; I prefer a heavy corrugated board. One element (the top of the inner shell) is constructed of a material of relatively high heat conducting capacity.

The container consists essentially of an outer and an inner shell with a space between the two shells. The top and bottom of each shell are horizontal planes and parallel to each other. The sides of the shells are vertical. The number of sides of the outer shell and of the inner shell are the same. I prefer cubical shells; the cubical container is more economical to construct and more practical to handle. The two shells are so placed in relation to each other that each side of the inner shell is parallel to a side of the outer shell; and the top and bottom of each shell are parallel to the respective top and bottom of the other shell.

The inner shell is of the same shape as the outer shell, but is sufficiently smaller to be contained in the outer shell, leaving spaces between the respective tops, bottoms and sides of the two shells. The width of the spaces will vary with the type and thickness of material used in constructing the shell (a material of low heat conducting capacity will require a lesser space than a material of high heat conducting capacity), the degrees of temperature to be held, and the exterior temperature. A corrugated board shell approximately one-quarter inch thick requires spaces of approximately one inch.

Figure 1:
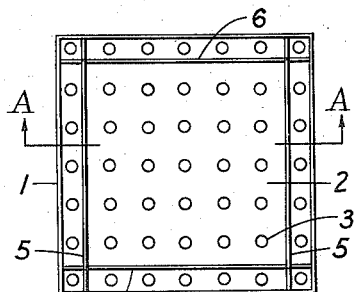
Figure 2:
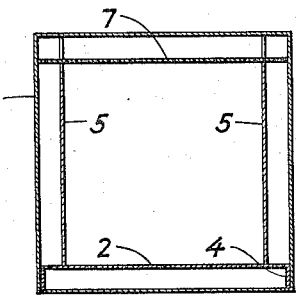

The accompanying drawing shows as Figure 1 a plan of the entire assembled container. Figure 1 shows the inner shell formed by the side partitions and companion side partitions in place. Figure 2 is a section at A—A (Figure 1) and likewise shows the inner shell in place and the relation of the various elements to each other.

Figure 3:
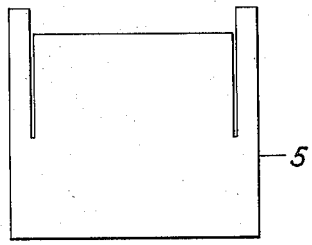
Figure 4:
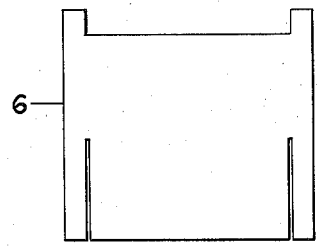

Figures 3 and 4 show respectively a side partition and a companion side partition. Two of each partitions are required, and in constructing the container are placed in the outer shell as shown in Figure 1 respectively as 5 and 5 and as 6 and 6.

Figure 5:
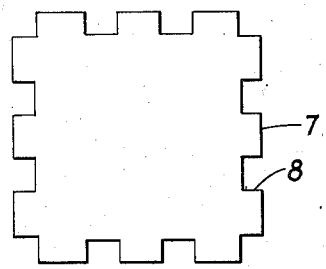

Figure 5 shows the top of the inner shell; it is of thin sheet metal; I use metal from one-sixteenth to one-eighth of an inch thick. It is essential that it cover the top of the inner shell, but that it does not cover all of the top of the side and corner compartments. Figure 5 shows indentations; an alternate method of construction would be holes rather than the indentations. An alternate method of construction would be the bending of such portion of the top to the inner shell which would extend beyond the sides of the inner shell at right angles to the top; the top would then fit over the inner shell and would be held in place by the bent sides. Another method of construction would be the pressing of grooves in the metal top to correspond with the top of the side and companion side partitions so that the top would be held in place by the top of the partitions fitting in the grooves.

Figure 6:
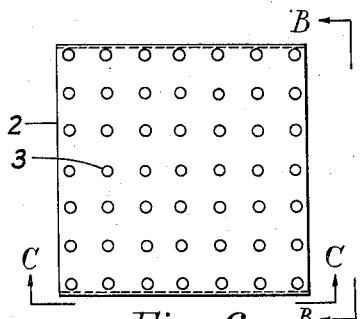
Figure 7:
Figure 8:
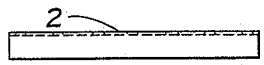

A plan of the bottom partition is shown in Figure 6. The holes (3) may be any shape or size and in any locations but some must be between the inner shell and the outer shell and some must be within the inner shell. Figure 7 shows an elevation B—B of the bottom partition; figure 8 shows an elevation C—C of the bottom partition.

The inner shell is filled with the substance or object to be held within certain temperature limits. The top to the inner shell is inserted, and the solid refrigerant is then placed on the top of the inner shell. The top to the outer shell is then closed. The solid refrigerant (solid $CO_2$) sublimates into $CO_2$ gas and the gas, after filling the space at the top, and being heavier than air, pours down into and fills the spaces between the sides of the outer and inner shells and thence into the bottom space. The metal top of the inner shell is cooled by direct contact with the solid refrigerant and the cold gas in the upper space and, in turn, cools the air at the top of the interior of the inner shell. The interior of the inner shell cools, and the air therein contracts causing a partial vacuum. The $CO_2$ gas rises from the bottom into the inner shell through the holes in the bottom of the inner shell.

The temperature can be maintained within limits indefinitely by the addition of the solid refrigerant from time to time. The limits of temperature vary according to the size of the container, the size of the spaces, the material used in constructing the container, the amount of solid refrigerant used, and the contents of the inner shell. The effect of the atmospheric temperature is generally so slight that it may be disregarded. Experiments determine that a container constructed of standard corrugated board, with spaces of one inch, with interior dimensions of the inner shell of eleven inches by eleven inches square by nine inches high, using initially three pounds of solid $CO_2$, and with five pounds of frozen pudding or ice cream as its contents, will maintain a temperature between minus 5 and plus 5 degrees Fahrenheit for ten hours.

I claim:

A container of the character described comprising an inner and an outer shell with spaces between the top, bottom and sides of the inner shell and the corresponding top, bottom and sides of the outer shell; the bottom to the inner shell being perforated; the top to the inner shell being of heat conducting capacity relatively higher than the remainder of the container.

CLARENCE VAN H. KING, JR.